US012129339B2

(12) United States Patent
Courtemanche et al.

(10) Patent No.: US 12,129,339 B2
(45) Date of Patent: Oct. 29, 2024

(54) BRIDGED FRUSTRATED LEWIS PAIRS AS THERMAL TRIGGER FOR REACTIONS BETWEEN Si—H AND Si—OR

(71) Applicant: Dow Silicones Corporation, Midland, MI (US)

(72) Inventors: Marc-Andre Courtemanche, Midland, MI (US); Eun Sil Jang, Columbus, OH (US); Yanhu Wei, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 493 days.

(21) Appl. No.: 17/599,779

(22) PCT Filed: Jun. 2, 2020

(86) PCT No.: PCT/US2020/035641
§ 371 (c)(1),
(2) Date: Sep. 29, 2021

(87) PCT Pub. No.: WO2020/247334
PCT Pub. Date: Dec. 10, 2020

(65) Prior Publication Data
US 2022/0169794 A1    Jun. 2, 2022

Related U.S. Application Data

(60) Provisional application No. 62/856,772, filed on Jun. 4, 2019.

(51) Int. Cl.
| C08G 77/08 | (2006.01) |
| C08G 77/06 | (2006.01) |
| C08G 77/12 | (2006.01) |
| C08G 77/16 | (2006.01) |
| C08G 77/18 | (2006.01) |
| C08L 83/04 | (2006.01) |

(52) U.S. Cl.
CPC ............. *C08G 77/08* (2013.01); *C08G 77/06* (2013.01); *C08G 77/12* (2013.01); *C08G 77/16* (2013.01); *C08G 77/18* (2013.01); *C08L 83/04* (2013.01)

(58) Field of Classification Search
CPC ...................................................... C08L 83/04
See application file for complete search history.

(56) References Cited

U.S. PATENT DOCUMENTS

| 4,254,271 | A | 3/1981 | Finke et al. |
| 5,721,290 | A | 2/1998 | Eckberg et al. |
| 5,866,261 | A | 2/1999 | Kerr, III et al. |
| 6,218,445 | B1 | 4/2001 | Priou et al. |
| 6,548,568 | B1 | 4/2003 | Pinto et al. |
| 6,777,512 | B1 | 8/2004 | Sonnenschein et al. |
| 7,064,173 | B2 | 6/2006 | Rubinsztajn et al. |
| 7,906,605 | B2 | 3/2011 | Cray et al. |
| 8,048,819 | B2 | 11/2011 | Rubinsztajn et al. |
| 8,470,899 | B2 | 6/2013 | Maliverney |
| 8,629,222 | B2 | 1/2014 | Takizawa et al. |
| 8,968,868 | B2 | 3/2015 | Yang et al. |
| 9,006,336 | B2 | 4/2015 | Yang et al. |
| 9,006,357 | B2 | 4/2015 | Yang et al. |
| 9,035,008 | B2 | 5/2015 | Yang et al. |
| 9,624,154 | B2 | 4/2017 | Blair |
| 9,856,194 | B2 | 1/2018 | Fontaine et al. |
| 10,259,908 | B2 | 4/2019 | Arkles et al. |
| 2003/0139287 | A1 | 7/2003 | Deforth et al. |
| 2005/0136269 | A1 | 6/2005 | Doehler et al. |
| 2006/0211836 | A1 | 9/2006 | Rubinsztajn et al. |
| 2006/0241271 | A1 | 10/2006 | Rubinsztajn et al. |
| 2006/0280957 | A1 | 12/2006 | Lee et al. |
| 2006/0293172 | A1 | 12/2006 | Rubinsztajn et al. |
| 2008/0281469 | A1 | 11/2008 | Choi et al. |
| 2009/0192282 | A1 | 7/2009 | Janvikul et al. |
| 2010/0144960 | A1 | 6/2010 | Cray et al. |
| 2013/0234070 | A1 | 9/2013 | Mowrer |
| 2015/0141570 | A1 | 5/2015 | Buckanin et al. |
| 2015/0376481 | A1 | 12/2015 | Larson et al. |
| 2016/0289388 | A1 | 10/2016 | Fu et al. |
| 2016/0319081 | A1* | 11/2016 | Kumar .................. C08G 77/44 |
| 2019/0031932 | A1 | 1/2019 | Zhang et al. |

FOREIGN PATENT DOCUMENTS

| CA | 2894146 A1 | 6/2014 |
| CN | 1989178 A | 6/2007 |
| CN | 104877310 A | 9/2015 |
| FR | 2824835 A1 | 11/2002 |
| WO | 2008125911 A2 | 10/2008 |
| WO | 2011045605 A1 | 4/2011 |
| WO | 2012060449 A1 | 5/2012 |
| WO | 2013142956 A1 | 10/2013 |
| WO | 2016097734 A1 | 6/2016 |
| WO | 2016168914 A1 | 10/2016 |

(Continued)

OTHER PUBLICATIONS

Asenjo-Sanz et al., "Zwitterionic Polymerization of Glycidyl Monomers to Cyclic Polyethers with B(C6F5)3" The Royal Society of Chemistry, 2012 pp. 1-5.
Chakraborty et al., "Catalytic Ring-Opening Polymerization of Propylene Oxide by Organoborance and Aluminum Lewis Acids" Macromolecules, 2003, pp. 5470-5481.
Grande, "Testing the functional tolerance of the Piers-Rubinsztajin reaction: a new strategy for functional silicones", Chem. Comm., 2010, pp. 4988-4990, vol. 46.
Herzberger et al., "Polymerization of Ethylene Oxide, Propylene Oxide, and Other Alkylene Oxides: Synthesis, Novel Polymer Architectures, and Bioconjugation" Chemical Reviews, American Chemical Society, 2016, pp. 2170-2243.

(Continued)

*Primary Examiner* — Marc S Zimmer
(74) *Attorney, Agent, or Firm* — Catherine U. Brown; Steve Mork

(57) ABSTRACT

A composition contains a mixture of silyl hydride, a silanol and/or a silyl ether, and a Bridged Frustrated Lewis Pair.

16 Claims, No Drawings

(56) References Cited

FOREIGN PATENT DOCUMENTS

| WO | 2017100904 A1 | 6/2017 |
|---|---|---|
| WO | 2019070866 A1 | 4/2019 |
| WO | 2020247337 A1 | 12/2020 |

OTHER PUBLICATIONS

Berkefeld, "Tandem Frustrated Lewis Pair/Trisborane-Catalyzed Deoxygenative Hydrosilylation of Carbon Dioxide", JACS, 2010, pp. 10060-10661, vol. 132.
Brook, "New Control Over Silicone Synthesis using SiH Chemistry: The Piers-Rubinsztajn Reaction", Chem. Eur. J., 2018, pp. 8458-8469, vol. 24.
Cella, "Preparation of Polyaryloxysilanes and Polyaryloxysiloxanes by B(C6F5)3 Catalyzed Polyetherification of Dihydrosilanes and Bis-Phenols", Macromolecules, 2008, pp. 6965-6971, vol. 41.
Chen et al., "B(C6F5)3-Catalyzed Group Transfer Polymerization of Acrylates Using Hydrosilane: Polymerization Mechanism, Applicable Monomers, and Synthesis of Well-Defined Acrylate Polymers", Macromolecules, 2019, pp. 844-856, vol. 52.
Chojnowski et al., "Mechanism of the B(C6F5)3-Catalyzed Reaction of silyl Hydrides with Alkoxysilanes. Kinetic and Spectroscopic Studies" Organometallics, 2005, vol. 24, pp. 6077-6084.
Chojnowski, "Hydride Tranfer Ring-Opening Polymerization of a Cyclic Oligomethylhydrosiloxane. Route to a Polymer of Closed Multicyclic Structure", Macromolecules, 2012, pp. 2654-2661, vol. 45.
Chojnowski, "Oligomerization of Hydrosiloxanes in the Presence of Trisborane", Macromolecules, 2006, pp. 3802-3807, vol. 39.
Fawcett et al., "Rapid, Metal-Free Room Temperature Vulcanization Produces Silicone Elastomers" J. Polym. Sci. A Polym. Chem., 2013, vol. 51, pp. 644-652.
Fuchise, "B(C6F5)3-Catalyzed Group Transfer Polymerization of n-Butyl Acrylate with Hydrosilane through In Situ Formation of Initiator by 1,4-Hydrosilylation of n-Butyl Acrylate", ACS Macro Lett., 2014, pp. 1015-1019, vol. 3.
Hoque, "Polysiloxanes with Periodically Distrubuted Isomeric Double-Decker Silsesquioxane in the Main Chain", Macromolecules, 2009, pp. 3309-3315, vol. 42.
Khalimon et al., "A Photo Lewis Acid Generator (PhLAG): Controlled Photorelease of B(C6F5)3", JACS, 2012, pp. 9601-9604, vol. 134.
Khalimon, "Photo Lewis acid generators: photorelease of B(C6F5)3 and applications to catalysis", Dalt. Trans., 2015, pp. 18196-18206, vol. 44.
Kim, "Metal-Free Hydrosilylation Polymerization by Borane Catalyst", Angew. Chem. Int. Ed, 2015, pp. 14805-14809, vol. 54.
Lambert et al., "A Stable B-Silyl Carbocation", J. Am. Chem. Soc., 1996, vol. 118, pp. 7867-7868.
Lambert et al., "B-Silyl and B-Germyl Carbocations Stable at Room Temperature", J. Org. Chem., 1999, vol. 64, pp. 2729-2736.
Matsumoto et al., "One-Pot Sequence-Controlled Synthesis of Oligosiloxanes" Angew. Chem. Int. Ed. 2018, vol. 67, pp. 4637-4641.
Mitsuo, "NewHorizon of Organosilicon Chemistry", Dalt. Trans., 2010, pp. 9369-9378, vol. 39.
Momming, "Reversible Metal-Free Carbon Dioxide Binding by Frustrated Lewis Paris", Angew. Chem. Int. Ed., 2009, pp. 6643-6646, vol. 48.
Oertle et al., "Hydrosilylation of tetrasubstituted Olefins" Tetrahedron Lett., 1985, vol. 26, pp. 5511-5514.
Oestreich, "A unified survey of Si—H and H—H bond activation catalysed by electron-deficient boranes", Chem. Soc. Rev., 2015, pp. 2202-2220, vol. 44.
Perez et al., "Olefin Isomerization and Hydrosilylation Catalysis by Lewis Acidic Organofluorophosphonium Salts" J. Am. Chem. Soc., 2013, 135, 18308.
Piers et al., "Mechanistic Aspects of Bond Activation with Perfluoroarylboranes", Inorg. Chem., 2011, vol. 50, pp. 12252-12262.
Rubin et al., "Highly Efficient B(C6F5)3-Catalyzed Hydrosilylation of Olefins" J. Org. Chem, 2020, vol. 67, pp. 1936-1940.
Simonneau et al., "3-Silylated Cyclohexa-1,4-dienes as Precursors for Gaseous; Hydrosilanes: The B(C6F5)3-Catalyzed Transfer Hydrosilylation of; Alkenes" Angew. Chem. Int. Ed., 2013, vol. 52, pp. 11905-11907.
Song et al., "Lewis Acid-Catalyzed Regio- and Stereoselective Hyddrosiylation of Alkenes with Trialkylsilanes" Organometallics, 1999, vol. 18, pp. 3109-3115.
Stephan, "Frustrated Lewis Pair Chemistry: Development and Perspectives", Angew. Chem. Int. Ed., 2015, pp. 6400-6441, vol. 54.
Stephan, "Frustrated Lewis Pairs", JACS, 2015, pp. 10018-10032, vol. 137.
Yamamoto et al., "Sterochemistry of Aluminum Chloride Catalyzed Hydrosilylation of Methylcyclohexenes" Synlett, 1990, pp. 259-260.
Zhang, "Piers' borane-mediated hydrosilylation of epoxides and cyclic ethers", Chem. Commun., 2018, pp. 7243-7246, vol. 54.
Zhao et al., "N-Heterocyclic Carbene-Catalysed Hydrosilylation of Styryl and Propargylic Alcohols with Dihydrosilanes" Chem. Eur. J., 2011, vol. 17, pp. 9911-9914.
Kamino, et. al., "Siloxane-Triarylamine Hybrids: Discrete Room Temperature Liquid Triarylamines via the Piers-Rubinsztajn Reaction" Organic Letters, 2011, pp. 154-157, vol. 13, No. 1.
Voss, et. al., "Frustrated Lewis Pair Behavior of Intermolecular Amine/B(C6F5)3 Pairs" Organometallics, 2012, pp. 2367-2378, vol. 31.
Stephan, et. al., "Frustrated Lewis Pairs: Metal-free Hydrogen Activation and More" Angew. Chem. Int. Ed., 2010, pp. 46-76, vol. 49.

* cited by examiner

BRIDGED FRUSTRATED LEWIS PAIRS AS THERMAL TRIGGER FOR REACTIONS BETWEEN Si—H AND Si—OR

CROSS REFERENCE TO RELATED APPLICATIONS

This application is a U.S. national stage filing under 35 U.S.C. § 371 of PCT Application No. PCT/US20/035641 filed on 2 Jun. 2020, currently pending, which claims the benefit of U.S. Provisional Patent Application No. 62/856,772 filed 4 Jun. 2019 under 35 U.S.C. § 119 (e). PCT Application No. PCT/US20/035641 and U.S. Provisional Patent Application No. 62/856,772 are hereby incorporated by reference.

BACKGROUND OF THE INVENTION

Field of the Invention

The present invention relates to use of a bridged frustrated Lewis pair as a thermal trigger for chemical reaction between silyl hydrides and silyl ethers and/or silanol. The bridged frustrated Lewis pair dissociates to release a Lewis acid upon heating. The Lewis acid serves as a catalyst for the chemical reaction between silyl hydrides and silyl ethers and/or silanol.

INTRODUCTION

Frustrated Lewis Pairs ("FLP"s) is a term that refers to pairs of Lewis acids and Lewis bases in which steric congestion precludes the Lewis acid and Lewis base from complexing and neutralizing each other. When combined, the Lewis acids and bases of FLPs remain independent from one another rather than combine to neutralize one another. Yet, FLPs have been found to bind indirectly to one another in the form of Bridged Frustrated Lewis Pairs ("B-FLP"s), where a bridging molecule is bound to both the acid and the base of a FLP to create a complex with the bridging molecule between the Lewis acid and Lewis base. In some instances, the bridging molecule can sever to create a blocked Lewis acid and a blocked Lewis base with a portion of the bridging molecule complexed with and blocking each of the Lewis acid and Lewis base from further complexing or reacting. Hydrogen ($H_2$) is an example of a bridging molecule that severs in such a manner upon forming a B-FLP.

B-FLPs have been used to activate the bridging molecule for use in chemical reactions. For example, hydrogen ($H_2$) has been used as a bridging molecule in a B-FLP in order to activate the hydrogen for use in hydrogenation reactions (See, for example, JACS 2015, 137, 10018-10032) and carbon dioxide has been used as a bridging molecules in B-FLP in order to activate the carbon dioxide for deoxygenative hydrosilylation (See, for example, JACS 2010, 132, 10660-10661). Other molecules used as bridging molecules in a B-FLP for use in activating them for chemical reactions include nitrous oxide ($N_2O$), sulfur dioxide ($SO_2$), alkenes and alkynes. See, for example: Angew. Chem. Int. Ed. 2009, 48, 6643-6646; Angew. Chem. Int. Ed. 2015, 54, 6400-6441; and JACS 2015, 137, 10018-10032.

It would be surprising and useful to discover additional uses for B-FLPs, particularly if such uses allow control over chemical reactions other than those involving the bridging molecule.

BRIEF SUMMARY OF THE INVENTION

The present invention offers a surprising and unexpected use for B-FLPs as thermal triggers for reactions between silyl hydride (Si—H) and silanol (Si—OH) or silyl ether (Si—OR).

Si—H and Si—OR are known to react in the presence of a strong Lewis acid catalyst to produce siloxane and R—H in what has become known as a Piers-Rubinsztajn ("PR") reaction. Since the discovery of the PR reaction, it was found that silanol can be used in place of silyl ether in a PR-like reaction to produce siloxane and hydrogen gas. Use of PR and PR-like reactions (jointly referred to herein as "PR-type reactions") can be desirable for curing siloxanes in coating, adhesive, elastomer and foaming applications. However, these reactions are notoriously rapid. Therefore, PR-type reaction systems are typically two-part systems where the catalyst is kept apart from the Si—H and/or the Si—OH/Si—OR until reaction is desired. It is desirable if PR-type reaction components could be stored together in a one-part system in a way that provided shelf stability for storage but had a way to trigger the PR-type reaction when desired to cure the system. There are systems where the Lewis acid catalyst is complexed with an ultraviolet (UV) sensitive blocker that precludes the catalyst from enabling a PR-type reaction until irradiated with UV light. However, such systems need to be stored in the dark for shelf stability and must be exposed to UV light to initiate curing. Release of the Lewis acid upon exposure to UV light tends to be slow, resulting in a slowly initiated reaction upon exposure to UV light. Applications of UV-blocked Lewis acids require triggering thin films so the UV light can effectively penetrate into the composition and to achieve high surface area exposure. Therefore, UV blocking of Lewis acids has shortcomings when desiring a composition that does not need to remain hidden from UV light exposure prior to initiating the Lewis acid catalyzed reaction, rapid initiation of the reaction (rapid release of the Lewis acid), and/or an ability to rapidly trigger reactions in bulk compositions.

The present invention is a result of discovering that B-FLPs can be used in one-component PR-type reaction systems as latent Lewis acid catalysts which are triggered thermally. That is, a B-FLP comprising a Lewis acid PR-type reaction catalyst can be combined with a silyl hydride and a silanol and/or silyl ether to form a one-part reactive system that is shelf stable at 23° C. but that reacts quickly when heated to release the Lewis acid from the B-FLP. When heated, the B-FLP breaks apart freeing the Lewis acid catalyst, enabling the catalyst to initiate the PR reaction. Desirably, compositions of the present invention using B-FLPs can be exposed to UV light without triggering the reaction by unblocking Lewis acid.

B-FLPs have been found to be particularly efficient triggering agents because once broken they are unlikely to recombine. That means that once the Lewis acid is freed it will continue to catalyze the reaction without inhibition by reformation of the B-FLP. That is an advantage over Lewis acids inhibited by complexing directly to a Lewis base because the Lewis base remains in solution and can recombine with a free Lewis acid to neutralize the Lewis acid and inhibit its ability to catalyze a reaction. B-FLPs require reformation of a bridged complex between the Lewis acid and base, which is much less likely to randomly occur. This is particularly true with fugitive bridging molecules such as those that are gaseous and escape the reaction system or that can react with another molecule in the system and become unavailable once the B-FLP is broken. As a result, use of a B-FLP offers unprecedented control over irreversibly triggering the reaction without interference form a catalyst inhibitor because when heated sufficiently to dissociate the B-FLP, the acid catalyst is expected to be essentially irreversibly released to catalyze the rapid PR-type reaction.

In a first aspect, the present invention is composition comprising a mixture of silyl hydride, a silanol and/or a silyl ether, and a Bridged Frustrated Lewis Pair.

In a second aspect, the present invention is a chemical reaction process comprising the steps of: (a) providing a composition of the first aspect; and (b) heating the composition to a temperature sufficient to dissociate the Lewis acid from the Bridged Frustrated Lewis Pair.

The present invention is useful for preparing coatings, adhesives, elastomers and foams.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standardization.

Products identified by their tradename refer to the compositions available from the suppliers under those tradenames on the priority data of this application.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

The composition of the present invention comprises a mixture of silanol and/or silyl ether, silyl hydride and a Bridged Frustrated Lewis Pair. The composition is useful as a shelf stable at 23° C., heat-triggered reactive mixture.

"Silanols" are molecules that contain a silicon-hydroxyl ("Si—OH") bond and can contain multiple Si—OH bonds.

"Silyl ethers" are molecules that contain a silicon-oxygen-carbon ("Si—O—C") bond and can contain multiple Si—O—C bonds.

"Silyl hydrides" are molecules that contain a silicon-hydrogen (Si—H) bond and can contain multiple Si—H bonds.

A "Frustrated Lewis Pair", or "FLP", is a system of Lewis acids and Lewis bases in which steric congestion precludes the Lewis acid and Lewis base from complexing and completely neutralizing ("blocking") each other. FLPs are known in the art and have been characterized in articles such as JACS 2015, 137, 10018-10032 and the articles identified therein. Desirably, the FLP is a system of Lewis acids and Lewis bases in which congestion precludes their complexing and neutralizing at 20 degrees Celsius (° C.). While FLPs are known in the art, one can determine whether any Lewis pair is a FLP by combining at 20° C. equal molar amounts of the Lewis acid and Lewis base in a solvent that dissolves both. If more than 10 molar percent of the Lewis acid and Lewis base remain dissociated then the Lewis acid and Lewis base can be considered a FLP. Determine extent of dissociation by any means reasonable such as by nuclear magnetic resonance spectroscopy or, preferably ion chromatography using conductimetric or photometric detectors.

Upon heating compositions of the present invention, the B-FLP releases Lewis acid which catalyzes a reaction between the silanol and/or silyl ether and the silyl hydride. Heating the composition to a temperature of 80° C. or higher, 90° C. or higher, 100° C. or higher, 110° C. or higher, 120° C. or higher, 130° C. or higher, 140° C. or higher, 150° C. or higher, 160° C. or higher, 170° C. or higher, 180° C. or higher, 190° C. or higher, 200° C. or higher, 210° C. or higher and at the same time, generally 300° C. or lower, 250° C. or lower, 240° C. or lower, 230° C. or lower, 220° C. or lower, 210° C. or lower, 200° C. or lower, 175° C. or lower, 150° C. or lower, 140° C. or lower, 130° C. or lower, 120° C. or lower, 110° C. or lower, or even 100° C. or lower causes the components in the composition to react and cure in 10 minutes or less, preferably 5 minutes or less, even more preferably in one minute or less and yet more preferably in 30 seconds or less.

The reaction between a silyl ether and silyl hydride is generally represented by the following reaction:

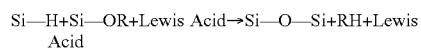

where R is an alkyl, substituted alkyl, aryl or substituted aryl provided it has a carbon attached to the oxygen shown. "Alkyl" is a hydrocarbon radical derived from an alkane by removal of a hydrogen atom. "Substituted alkyl" is an alkyl that has an atom, or chemical moiety, other than carbon and hydrogen in place of at least one carbon or hydrogen. "Aryl" is a radical derived from an aromatic hydrocarbon by removal of a hydrogen atom. "Substituted aryl" is an aryl that has an atom, or chemical moiety, other than carbon and hydrogen in place of at least one carbon or hydrogen.

The reaction between a silanol and silyl hydride is generally represented by the following reaction:

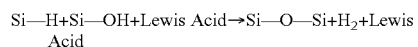

The composition of the present invention is shelf stable. "Shelf stable" means that the composition does not form gel at 23° C. in 5 hours or less, preferably 10 hours or less, more preferably 15 hours or less, even more preferably 24 hours or less.

Silanol/Silyl Ether

The present invention can comprise silanol without any silyl ether, silyl ether without any silanol or can comprise both silanol and silyl ether. When the composition comprises both silanol and silyl ether the silanol can be a different molecule than the silyl ether or the silanol and silyl ether can be the same molecule with both Si—OH and Si—O—C bonds.

Silanols and silyl ethers for use in the present invention can be linear, branched or a combination of linear and branched molecules. Branched molecules contain three or four "branches" off from a single "branch" or "backbone" atom. A "branch" contains two atoms bonded together. Hence, a branched molecule contains one atom (a "backbone" atom) that has bonded to it three or four atoms (first branch atoms) that each have yet another atom (second branch atoms) bonded to it to. Branches can extend any number of atoms beyond two. Preferably, branches in a branched molecule contain three or more, four or more, five or more, six or more, seven or more, eight or more, nine or more and even 10 or more atoms. At the same time, while there is technically no upper limit to the length of branches in a branched atom, branched silanols and silyl ethers for use in the present invention typically have 10,000 or fewer, preferably 5,000 or fewer, 1,000 or fewer, 500 or fewer and can have 100 or fewer, 50 or fewer, 30 or fewer, 20 or fewer, and even 10 or fewer atoms in each branch.

Silanols of the present invention have a Si—OH bond. The silanol can have one or more than one Si—OH bond. It is expected that silanols of any kind are suitable. The silanol can be a hydroxylated silane or a hydroxylated siloxane. The silanol can be a siloxane with a degree of polymerization (DP) of 10 or more, preferably 20 or more, more preferably 30 or more, and can be 40 or more 50 or more, 75 or more, 100 or more, 250 or more, 500 or more, 1000 or more, 2,000 or more, 4,000 or more, 6,000 or more and even 8,000 or more while at the same time is typically 10,00 or less, preferably 8,000 or less, 6,000 or less, 4,000 or less, 2,000 or less, 1,000 or less, 800 or less, 600 or less, 400 or less, 200 or less or even 100 or less. DP corresponds to the number of siloxy (Si—O containing) groups there are in the molecule and can be determined by silicon-29 nuclear magnetic resonance ($^{29}$Si NMR) spectroscopy.

Silyl ethers of the present invention can have one or more than one Si—O—C bond. Generally, any silyl ether is expected to be suitable. Typically, the silyl ether will have a degree of polymerization (DP) of 10 or more, preferably 20 or more, more preferably 30 or more, and can be 40 or more 50 or more, 75 or more, 100 or more, 250 or more, 500 or more, 1000 or more, 2,000 or more, 4,000 or more, 6,000 or more and even 8,000 or more while at the same time is typically 10,00 or less, preferably 8,000 or less, 6,000 or less, 4,000 or less, 2,000 or less, 1,000 or less, 800 or less, 600 or less, 400 or less, 200 or less or even 100 or less. DP corresponds to the number of siloxy (Si—O containing) groups there are in the molecule and can be determined by silicon-29 nuclear magnetic resonance ($^{29}$Si NMR) spectroscopy.

The silanol and/or silyl ether of the present invention can be polymeric. Desirably, the silanol and/or silyl ether is a polysiloxane molecule with one or more than one Si—OH and/or Si—O—C bond. The polysiloxane can be linear and comprise only M ($\equiv$SiO$_{1/2}$) type and D ($=$SiO$_{2/2}$) type units. Alternatively, the polysiloxane can be branched and contain T (—SiO$_{3/2}$) and/or Q (SiO$_{4/2}$) type units. Typically, M, D, T and Q units have methyl groups attached to the silicon atoms where oxygen is not attached to provide a valence of four to each silicon and each oxygen is attached to the silicon of another unit. Referring to these as M, D, T and Q "type" units means that groups such as those selected from a group consisting of hydrogen, alkyl, substituted alkyl, aryl, and substituted aryl groups can be bound to the silicon atoms in place of one or more methyl.

Examples of suitable silanols include those commercially available from the Dow Chemical Company as XIAMETER™ PMX-0156 silanol fluid, XIAMETER™ PMX-0930 silanol fluid and DOWSIL™ DS polymer, DOWSIL™ RSN-217 Flake Resin, DOWSIL™ RSN-233 Flake Resin, as well as those commercially available from Gelest as α,ω-hydroxyl-terminated poly(dimethylsiloxane), DMS-S12 (550 g/mol, 16-32 cSt), DMS-S14 (1270 g/mol, 35-45 cSt), and DMS-S31 (21,600 g/mol, 1000 cSt). XIAMETER is a trademark of Dow Corning Corporation. DOWSIL is a trademark of The Dow Chemical Company.

Examples of suitable silyl ethers include those commercially available from The Dow Chemical Company under the following trade names: XIAMETER™ OFS-6070 silane, XIAMETER™ OFS-6011 silane, XIAMETER™ OFS-6020 silane, XIAMETER™ OFS-6030 silane, DOWSIL™ Z-6062 silane, DOWSIL™ Z-6300 silane, DOWSIL™ Z-6341 Silane, XIAMETER™ OFS-6040 silane, DOWSIL™ Z-6023 silane, DOWSIL™ Z-6015 silane, XIAMETER™ OFS-6920 silane, XIAMETER™ OFS-6690 silane and XIAMETER™ OFS-6076 silane, DOWSIL™ 3074 Intermediate and DOWSIL™ 3037 Intermediate. XIAMETER is a trademark of Dow Corning Corporation. DOWSIL is a trademark of The Dow Chemical Company.

Typically, the combined concentration of silanol and silyl ether in the composition is 70 weight-percent (wt %) or more, 75 wt % or more, 80 wt % or more, 85 wt % or more, even 90 wt % or more while at the same time is typically 90 wt % or less, 85 wt % or less, 80 wt % or less, or even 75 wt % or less based on combined weight of silyl hydride, silanol, silyl ether and B-FLP in the composition.

Silyl Hydride

The silyl hydride contains one, preferably more than one, Si—H bond. The Si—H bond is typically part of polysilane (molecule containing multiple Si—H bonds) or polysiloxane. Silyl hydrides containing multiple Si—H bonds are desirable as crosslinkers in compositions of the present invention because they are capable of reacting with multiple silanol and/or silyl ether groups.

The silyl hydride can be the same or can be a different molecule from the silanol and/or silyl ether. That is, if the composition comprises a silanol then the silanol can also contain a Si—H bond and serve as both the silanol and the silyl hydride components of the composition. Similarly, if the composition comprises a silyl ether then the silyl ether can also contain a Si—H bond and serve as both the silyl ether and the silyl hydride components of the composition. Alternatively, the silyl hydride component can be a different molecule than the silanol and/or silyl ether that is also in the composition. The silanol and/or silyl ether can be free of Si—H bonds.

The silyl hydride of the present invention can be polymeric. The silyl hydride can be linear, branched or can contain a combination of linear and branched silyl hydrides. The silyl hydride can be a polysilane, a polysiloxane or a combination of polysilane and polysiloxanes.

Desirably, the silyl hydride is a polysiloxane molecule with one or more than one Si—H bond. The polysiloxane can be linear and comprise only M type and D type units. Alternatively, the polysiloxane can be branched and contain T type and/or Q type units.

Examples of suitable silyl hydrides include pentamethyldisiloxane, bis(trimethylsiloxy)methyl-silane, tetramethyldisiloxane, tetramethycyclotetrasiloxane, and hydride terminated poly(dimethylsiloxane) such as those available from Gelest under the tradenames: DMS-H03, DMS-H25, DMS-H31, and DMS-H41; and α,ω-hydride-terminated polyphenylmethyl siloxane (340 g/mol, 2-5 cSt; from Gelest under the name PMS-HO3).

The concentration of silyl hydride is typically sufficient to provide a molar ratio of Si—H groups to the combination of silanol and silyl ether groups that is 0.2 or more, 0.5 or more, 0.7 or more, 0.8 or more, 0.9 or more, 1.0 or more 1.2 or more, 1.4 or more, 1.6 or more, 1.8 or more, 2.0 or more, 2.2 or more, even 2.5 or more while at the same time is typically 5.0 or less, 4.5 or less, 4.0 or less, 3.5 or less, 3.0 or less, 2.8 or less, 2.5 or less, 2.3 or less, 2.0 or less, 1.8 or less, 1.6 or less, 1.4 or less, 1.2 or less or even 1.0 or less.

Either the silanol/silyl ether or the silyl hydride (or both) can serve as crosslinkers in the reaction. A crosslinker has at least two reactive groups per molecule and reacts with two different molecules through those reactive groups to cross link those molecules together. Increasing the linear length between reactive groups in a crosslinker tends to increase the flexibility in the resulting crosslinked product. In contrast, shortening the linear length between reactive groups in a crosslinker tends to reduce the flexibility of a resulting crosslinked product. Generally, to achieve a more flexible crosslinked product a linear crosslinker is desired and the length between reactive sites is selected to achieve desired flexibility. To achieve a less flexible crosslinked product, shorter linear crosslinkers or even branched crosslinkers are desirable to reduce flexibility between crosslinked molecules.

Typically, the concentration of silyl hydride in the composition is 5 wt % or more, 10 wt % or more, 15 wt % or more, 20 wt % or more, even 25 wt % or more while at the same time is typically 30 wt % or less, 25 wt % or less, 20 wt % or less, 15 wt % or less or even 5 wt % or less based on combined weight of silyl hydride, silanol, silyl ether and B-FLP in the composition.

Bridged Frustrated Lewis Pair

The Bridged Frustrated Lewis Pair ("B-FLP") is a complex comprising a FLP wherein a Lewis acid and a Lewis base of the FLP are both bound to a bridging molecule to form a neutralized complex with the bridging molecules residing between (that is, "bridging") the Lewis acid and Lewis base. The bridging molecule can severe, such as in the case of $H_2$, with a portion of the bridging molecule blocking the Lewis acid and another portion of the bridging molecule blocking the Lewis base. Alternatively, and preferably, the bridging molecule remains intact and the B-FLP is a stable complex (at least at 23° C.) with the bridging molecule simultaneously bound to the Lewis acid of the FLP and the Lewis base of the FLP.

The Lewis acid is selected from a group consisting of aluminum alkyls, aluminum aryls, aryl boranes including triaryl borane (including substituted aryl and triaryl boranes such as fluorinated aryl boranes including tris(pentafluorophenyl)borane), boron halides, aluminum halides, gallium alkyls, gallium aryls, gallium halides, silylium cations and phosphonium cations. Examples of suitable aluminum alkyls include trimethylaluminum and triethylaluminum. Examples of suitable aluminum aryls include triphenyl aluminum and tris-pentafluorophenyl aluminum. Examples of triaryl boranes include those having the following formula:

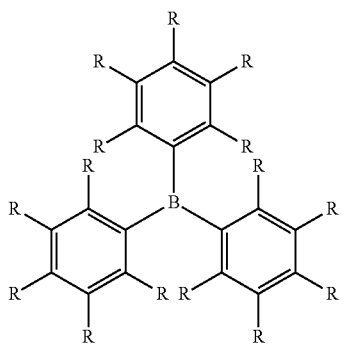

where R is independently in each occurrence selected from H, F, Cl and $CF_3$. Examples of suitable boron halides include $(CH_3CH_2)_2BCl$ and boron trifluoride. Examples of suitable aluminum halides include aluminum trichloride. Examples of suitable gallium alkyls include trimethyl gallium. Examples of suitable gallium aryls include triphenyl gallium. Examples of suitable gallium halides include trichlorogallium. Examples of suitable silylium cations include $(CH_3CH_2)_3Si^+X^-$ and $Ph_3Si^+X^-$. Examples of suitable phosphonium cations include $F-P(C_6F_5)_3^+X^-$.

The Lewis base is selected from a group consisting of the following bases: $PR_3$, $P(NR_2)_3$, $NR_3$, $N(SiR_3)_xR_{3-x}$, $RC(NR)N$, $P(N-R)R_3$, guanidines ($C(=NR)(NR_2)_2$), amidines ($RC(=NR)NR_2$), phosphazenes, and

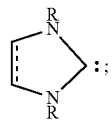

where R is in each occurrence independently selected from a group consisting of hydrogen, alkyl, substituted alkyl, aryl and substituted aryl. Examples of suitable Lewis basis of the structure $PR_3$ include tri(t-butyl)phosphine, tri(cyclohexyl)phosphine, PhP(tBu)$_2$; (cyclohexyl)P(tBu)$_2$; nBuP(tBu)$_2$; Me(tBu)$_2$; tBuP(i-Pr)$_2$; P(C$_6$H$_{11}$)$_3$; P(iBu)$_3$; and P(n-Bu)$_3$. Examples of suitable Lewis basis of the structure RC(NR)N include 1,5,7-Triazabicyclo[4.4.0]dec-5-ene; 7-Methyl-1,5,7-triazabicyclo4.4.0dec-5-ene; 2,3,4,6,7,8,9,10-Octahydropyrimido[1,2-a]azepine, (DBU). Examples of suitable guanidines include guanidine, biguanidine, and 1,1-dimethylguanidine. Examples of suitable amidines include diethylamide, and di-isopropyl amide. Examples of suitable phosphazenes include tert-Butylimino-tri(pyrrolidino)phosphorene; tert-Octylimino-tris(dimethylamino)phosphorene; and 2-tert-butylimino-2-diethylamino-1,3-dimethylperhydro-1,3,2-diazaphosphorine. Examples of suitable Lewis basis of the structure

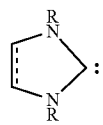

include 1,3-dimesityl-imidazol-4,5-dihydro-2-ylidene; 1,3-Bis(2,6-diisopropylphenyl)imidazol-2-ylidene; and 1,3-Bis(2,4,6-trimethylphenyl)-4,5-dihydroimidazol-2-ylidene.

The bridging molecule, in the broadest scope of the present invention, includes any molecule that will simultaneously bind and block the Lewis acid and Lewis base of a FLP to form a B-FLP. The interaction of the bridging molecule with the Lewis acid and Lewis base is such that the Lewis acid and Lewis base is blocked by the bridging molecule (or portion thereof) at 23° C. but unblocks at least the Lewis acid at temperatures of 120° C. or higher, preferably 110° C. or higher, more preferably 100° C. or higher, even more preferably 90° C. or higher, 80° C. or higher, or even 70° C. or higher and at the same time desirably 300° C. or lower, 240° C. or lower, 220° C. or lower, 200° C. or lower, 180° C. or lower, 160° C. or lower, 150° C. or lower, 125° C. or lower or even 100° C. or lower. Unblocking of the Lewis acid of the B-FLP can be evidenced by a composition of the present invention containing the B-FLP curing in less than $\frac{1}{10}^{th}$ the time required for it to gel at 23° C.

Examples of suitable bridging molecules include carbon dioxide, hydrogen molecule ($H_2$), nitriles, alkenes, alkynes, ketones, esters and aldehydes. Desirably, the bridging molecule contains 10 or fewer, preferably 9 or fewer and can contain 8 or fewer, 7 or fewer, 6 or fewer, 5 or fewer, 4 or fewer, 3 or fewer, 2 or fewer and even one or fewer or zero carbon atoms; while at the same time the bridging molecule can contain one or more, 2 or more, 3 or more, 4 or more, 5 or more and even 6 or more carbon atoms. As noted earlier herein, some bridging molecules can sever in the B-FLP with a portion of the bridging molecule blocking the Lewis acid and a portion of the bridging molecule blocking the Lewis base. It is preferable for the bridging molecule to remain non-severed while bridging the Lewis acid and Lewis base of a FLP. In that regard, the bridging molecule preferably is not $H_2$. More preferably, the bridging molecule does not include any molecules that sever while bridging the Lewis acid and Lewis base of a FLP.

The B-FLP is desirably "stable" in the composition of the present invention, which means it does not dissociate to release Lewis acid, at temperatures of 23° C. and lower. The B-FLP can be stable at temperatures of 30° C. or lower, 50° C. or lower, 70° C. or lower, even 80° C. or lower. At the same time, the B-FLP dissociates at temperatures of 120° C. and higher, preferably 110° C. and higher, more preferably 110° C. and higher, 100° C. and higher, 90° C. and higher and even 80° C. and higher. Determine if the B-FLP dissociates by looking for evidence of free Lewis acid by nuclear magnetic resonance spectroscopy ($^1H$ and $^{31}P$, $^{11}B$ and/or $^{27}Al$ as appropriate depending on the Lewis acid). Alternatively, dissociation of the B-FLP can be detected by a composition curing faster than the identical composition without B-FLP at a given temperature.

One method for preparing the B-FLP is by combining the Lewis acid and Lewis base of a FLP together with a bridging molecule in a solvent at 23° C. Mixing facilitates formation of the B-FLP. The B-FLP can usually be isolated from the solvent by evaporating the solvent or, if the B-FLP precipitates out from the solvent then by filtration. The B-FLP can be stored for extended periods of time at 23° C. and lower. The B-FLP can be combined with a silyl hydride and a silanol and/or silyl ether to form the composition of the present invention.

In contrast to typical blocked Lewis acid systems, the Lewis acid of the B-FLP of the present invention is complexed with a Lewis base through a bridging molecule so it is complexed with two molecules. Prior art has suggested complexing a Lewis acid directly with a blocking agent that is sensitive to ultraviolet (UV) light so upon irradiation with UV light the blocking agent dissociates from the Lewis acid. The B-FLP of the present invention does not require a UV light sensitive blocking agent and can be free of such can be free of components that cause the Lewis acid to be freed from the B-FLP upon irradiation of UV light. The B-FLP and composition of the present invention can be free of photoacid generators and can be free of any other components that upon exposure to UV radiation generates a Lewis acid.

Compositions of the present invention typically contain enough B-FLP to provide a concentration of Lewis acid that is 0.1 weight part per million weight parts (ppm) or more, one ppm or more, 10 ppm or more, 50 ppm or more, 100 ppm or more, 200 ppm or more 300 ppm or more, 400 ppm or more, 500 ppm or more, 600 ppm or more, 700 ppm or more, 800 ppm or more, 900 ppm or more 1000 ppm or more while at the same time typically 10,000 ppm or less, 5,000 ppm or less, 1,000 ppm or less based on combined weight of silyl hydride, silanol and silyl ether in the composition.

Compositions of the present invention offer the advantage of a one-component reactive system that is shelf stable, even when exposed to UV light. Unlike prior art, the composition does not require UV light to react, nor does the composition need to be blocked from exposure to UV light to remain shelf stable. Desirably, the stability of B-FLPs of the present invention do not depend on (that is, is independent from) exposure to UV light.

The composition of the present invention can be free of water. Alternatively, the composition of the present invention can comprise water, preferably at a concentration of one weight-percent (wt %) or less, 0.75 wt % or less, 0.5 wt % or less, 0.25 wt % or less 0.1 wt % or less, 0.05 wt % or less or even 0.01 wt % or less based on composition weight.

Optional Components

Compositions of the present invention can consist of the silyl hydride, silyl ether and/or silanol, and B-FLP. Alternatively, the compositions of the present invention can further comprise one or a combination of more than one optional component. Optional components are desirably present at a concentration of 50 wt % or less, 40 wt % or less, 30 wt % or less, 20 wt % or less, 10 wt % or less, 5 wt % or less, or even one wt % or less based on composition weight.

Examples of possible optional components include one or a combination of more than one component selected from a group consisting of hydrocarbyl solvents (typically at a concentration of 10 wt % or less, 5 wt % or less, even one wt % or less based on composition weight), pigments such as carbon black or titanium dioxide, fillers such as metal oxides including $SiO_2$ (typically at a concentration of 50 wt % or less based on composition weight), moisture scavengers, fluorescent brighteners, stabilizers (such as antioxidants and ultraviolet stabilizers), and corrosion inhibitors. The compositions of the present invention also can be free of any one or any combination of more than one such additional components.

Notably, the composition of the present invention can contain one wt % or less, 0.5 wt % or less water relative to composition weight. Desirably, the composition is free of water.

Chemical Reaction Process

The present invention includes a chemical reaction process comprising the steps of: (a) providing a composition of the present invention; and (b) heating the composition to a temperature sufficient to dissociate the Lewis acid from the B-FLP. Upon heating the composition of the present invention, Lewis acid is released from the B-FLP and catalyzes a reaction between the silyl hydride and silanol and/or silyl ether as described previously above. The composition of the present invention can be provided in step (a) by mixing together a B-FLP, a silyl hydride and a silanol and/or silyl ether.

The chemical reaction process can be run in an absence of water or with a concentration of water that is one weight-percent (wt %) or less, 0.75 wt % or less, 0.5 wt % or less, 0.25 wt % or less 0.1 wt % or less, 0.05 wt % or less or even 0.01 wt % or less based on weight of the composition provided in step (a).

The composition has application, for example, as coatings that undergo thermally triggered cure reactions or as reactive compositions for molding applications where a fluid is disposed within a mold and heated to trigger a cure to form a molded article. In such applications, the process of the present invention would further include a step after step (a) and prior to step (b) where the composition is applied to a substrate or placed in a mold.

EXAMPLES

Preparation of B-FLP

B-FLP(1). Working in a glovebox, place in a Schlenk flask equipped with a magnetic stir bar tri(t-butyl)phosphine (200 milligrams (mg), 1.0 millimole (mmol), 1 equivalent (equiv)) and tris-pentafluorophenylborane (500 mg, 1 mmol, 1 equiv) and dissolve the components in 10 milliliters (mL) of toluene. Seal the Schlenk flask and remove from the glovebox. Connect the Schlenk flask to a Schlenk line. Stir the contents of the Schlenk flask throughout the following step. Purge the Schlenk line with nitrogen and then bubble carbon dioxide through the line for two minutes. Open the Schlenk flask to the atmosphere of carbon dioxide and then replace the cap to the flask with a septum. Insert a needle through the septum to create an exit for the carbon dioxide gas and improve carbon dioxide circulation. After 5 minutes a white solid precipitates from the reaction mixture. Seal the flask and stir at room temperature for an additional hour. Move the flask to a glovebox. Add 20 mL of hexane and isolate the white solid by filtration through a glass frit. Wash the white solid with hexane three times (10 mL each time). The white solid is B-FLP(1) (540 mg, 71% yield). B-FLP(1) can be stored without decomposition even when exposed to UV light. Characterize the solid by $^1$H, $^{31}$P and $^{11}$B nuclear magnetic resonance spectroscopy (NMR) to confirm the absence of impurities and starting materials. The expected reaction and structure of B-FLP(1) is as follows:

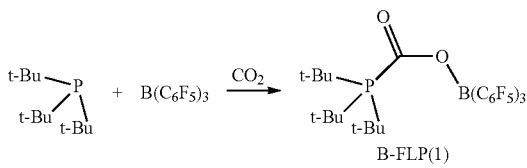

B-FLP(1)

Example 1. Silyl Ether Reaction

Prepare a composition in a glove box by combining in a scintillation vial equipped with a polytetrafluoroethylene (PTFE)-coated magnetic stir bar B-FLP(1) (2.3 mg, 0.08 wt %), hydroxilane 1 (2 g, 74 wt %) and methyltrimethoxysilane (0.7 g, 26 wt %). Hydrosilane I has the following formula: $MD_{3.3}D^H_{5.3}M$; and is commercially available from the Dow Chemical Company as DOWSIL™ 6-3570 polymer (DOWSIL is a trademark of The Dow Chemical Company).

Punch a venting needle through the septum of the vial. Stir the composition for 48 hours at 23° C. No reaction is evident. $^1$H and $^{31}$P NMR reveals no significant decomposition of B-FLP(1).

Remove the composition from the glove box and expose it to air for 30 minutes. No reaction is evident. Again, $^1$H and $^{31}$P NMR reveals no significant decomposition of B-FLP(1).

Heat the composition to 90° C. and in approximately 60 seconds gas evolution occurs and the composition rapidly solidifies into a foam. The foam is insoluble in organic solvents indicated a crosslinked structure.

Example 1 illustrates the stability of B-FLP(1) and shelf stability of the composition of Example 1 as well as the ability to thermally trigger curing of a silyl hydride and silyl ether with a B-FLP at 90° C.

Example 2. Silyl Ether Reaction

Allow B-FLP(1) to sit in atmosphere at 23° C. for 24 hours. $^1$H and $^{31}$P NMR reveals no significant decomposition of B-FLP(1).

Prepare a composition by combining B-FLP(1) (12.3 mg, 0.2 wt %), Hydrosilane II (5 g, 93 wt %) and trimethoxysilane (0.37 g, 7 wt %) in a scintillation vial equipped with a PTFE coated magnetic stir bar and begin stirring. Hydrosilane II has the following formula: $M^H D_{15} M^H$; and is commercially available as DOWSIL™ Q2-5057S Intermediate from The Dow Chemical Company.

No reaction occurred at 23° C. over the course of 48 hours. Heat to 90° C. and after 5 minutes gas evolution is evident and the composition rapidly solidifies into a cured polysiloxane. The foam is insoluble in organic solvents indicated a crosslinked polymer structure.

Example 2 illustrates the stability of B-FLP(1) and shelf stability of the composition of Example 2 as well as the ability to thermally trigger curing of a silyl hydride and silyl ether with a B-FLP at 90° C.

Example 3. Silanol Reaction

Prepare silyl hydride $MD^H_{65}M$ in the following manner. To a three-neck flask installed with mechanical stir were added 40 gram DI water, 10 gram heptane and 0.05 gram tosylic acid. A mixture of 200 gram methyldichlorosilane and 10 gram trimethylchlorosilane was added dropwise into the reaction solution while stirring within 30 min. After one hour stirring at 23° C., the reaction solution was washed three times with 50 mL DI water each time, dried with anhydrous sodium sulfate and filtered throw activated carbon layer. The volatiles were removed by Rotovap to obtain the silyl hydride $MD^H_{65}M$.

Prepare a composition by mixing 9 grams of silyl hydride $MD^H_{65}M$ and one gram silanol ($M^{OH}D_5M^{OH}$, commercially available as DMS-S12 from Gelest) together with a Speedmixer. Add 0.148 grams of a 5-weight-percent solution of B-FLP(1) in tetrahydrofuran so as to achieve a mixture containing 500 weight parts per million weight parts mixture of B-FLP(1). Mix the mixture with a Speedmixer. Notably, the composition of the silyl hydride and silanol are in standard notation where "M" corresponds to —SiO(CH$_3$)$_3$; "$M^{OH}$" corresponds to —SiO(OH)(CH$_3$)$_2$; $D^H$ corresponds to —SiO(H)(CH$_3$)—; and subscripts are relative number of units per molecule and an absence of a subscript means the subscript is one.

The composition has a shelf life at 23° C. of 16 hours as indicated by gel formation in 16 hours. Draw a 125 micrometer film of the composition onto a glossy paper substrate and heat to 90° C. in an oven. The film at 90° C. cures to a solid film without having a tacky surface in 30 seconds.

Example 3 illustrates the stability of the B-FLP, shelf stability of a composition comprising B-FLP, silyl hydride and silanol as well as the ability for a B-FLP to trigger a cure of silyl hydride and silanol upon heating to 90° C.

Comparative Example A. Ex 3 with BCF Instead of B-FLP(1)

Repeat Ex 3 except instead of adding 0.148 g of a 5 wt % solution of B-FLP(1) add 500 weight parts per million weight parts composition of tris(pentafluorophenyl)borane ("BCF") as an unblocked Lewis acid catalyst. The composition immediately (less than one minute) gels at 23° C. Comp Ex A illustrates that The Lewis acid in the B-FLP in Ex 3 immediately triggers reaction of the composition at 23° C. when unblocked, confirming the results form Example 3 shows the B-FLP stabilizes the BCF catalyst at 23° C. yet releases it to react quickly at 90° C.

What is claimed is:

1. A composition comprising a mixture of silyl hydride, a silanol and/or a silyl ether, and a Bridged Frustrated Lewis Pair.

2. The composition of claim 1, wherein the Bridged Frustrated Lewis Pair is derived from:
   (a) a Lewis acid selected from a group consisting of aluminum alkyls, aluminum aryls, aryl boranes, fluorinated aryl borane, boron halides, aluminum halides, gallium alkyls, gallium aryls, gallium halides, silylium cations and phosphonium cations;
   (b) a Lewis base selected from a group consisting of molecules having the following structures: $PR_3$, $P(NR_2)_3$, $NR_3$, $N(SiR_3)_xR_{3-x}$, 1,5,7-Triazabicyclo [4.4.0]dec-5-ene; 7-Methyl-1,5,7-triazabicyclo4.4.0dec-5-ene; 2,3,4,6,7,8,9,10-Octahydropyrimido[1,2-a]azepine (DBU), $P(N-R)R_3$, guanidines, amidines, phosphazenes, and

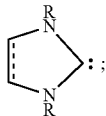

where R is in each occurrence independently selected from a group consisting of hydrogen, alkyl, substituted alkyl, aryl and substituted aryl; and
   (c) a bridging molecule connecting the Lewis acid and Lewis base, the bridging molecule selected from a group consisting of carbon dioxide, $H_2$, nitriles, alkenes, alkynes, ketones, esters and aldehydes.

3. The composition of claim 2, wherein the Lewis acid is a fluorinated aryl borane.

4. The composition of claim 2, wherein the Lewis base is selected from a group consisting of $PR_3$, $NR_3$, guanidines, amidines and phosphazenes.

5. The composition of claim 2, wherein the bridging molecule is selected from a group consisting of carbon dioxide, nitrile, alkynes and alkenes.

6. The composition of claim 1, wherein the Lewis acid is a fluorinated aryl borane, the Lewis base is selected from a group consisting of $PR_3$ and $NR_3$ and the bridging molecule is selected from a group consisting of carbon dioxide, alkynes, alkenes, and nitriles; where R is in each occurrence independently selected from a group consisting of hydrogen, alkyl, substituted alkyl, aryl and substituted aryl.

7. The composition of claim 1, wherein the Bridged Frustrated Lewis Pair is free of photoacid generators or other components that upon exposure to ultraviolet radiation generates a Lewis acid.

8. A chemical reaction process comprising the steps of:
   (a) providing a composition comprising a mixture of silyl hydride, a silanol and/or a silyl ether, and a Bridged Frustrated Lewis Pair; and
   (b) heating the composition to a temperature sufficient to dissociate the Lewis acid from the Bridged Frustrated Lewis Pair.

9. The process of claim 8, wherein after step (a) and prior to step (b) the composition is applied to a substrate or placed in a mold.

10. The composition of claim 3, wherein the bridging molecule is selected from a group consisting of carbon dioxide, nitrile, alkynes and alkenes.

11. The composition of claim 4, wherein the bridging molecule is selected from a group consisting of carbon dioxide, nitrile, alkynes and alkenes.

12. The composition of claim 2, wherein the Bridged Frustrated Lewis Pair is free of photoacid generators or other components that upon exposure to ultraviolet radiation generates a Lewis acid.

13. The composition of claim 3, wherein the Bridged Frustrated Lewis Pair is free of photoacid generators or other components that upon exposure to ultraviolet radiation generates a Lewis acid.

14. The composition of claim 4, wherein the Bridged Frustrated Lewis Pair is free of photoacid generators or other components that upon exposure to ultraviolet radiation generates a Lewis acid.

15. The composition of claim 5, wherein the Bridged Frustrated Lewis Pair is free of photoacid generators or other components that upon exposure to ultraviolet radiation generates a Lewis acid.

16. The composition of claim 6, wherein the Bridged Frustrated Lewis Pair is free of photoacid generators or other components that upon exposure to ultraviolet radiation generates a Lewis acid.

* * * * *